United States Patent Office 3,372,149
Patented Mar. 5, 1968

3,372,149
PROCESS FOR PREPARING SALTS OF AMINO-
ALKYL ESTERS OF CARBOXYLIC ACID
POLYMERS
Joseph Fertig, Elizabeth, Emil Daniel Mazzarella, Mountainside, and Martin Skoultchi, Somerset, N.J., assignors to National Starch and Chemical Corporation, New York, N.Y., a corporation of Delaware
No Drawing. Continuation-in-part of applications Ser. No. 394,055, Sept. 2, 1964, and Ser. No. 561,749, June 30, 1966. This application May 19, 1967, Ser. No. 639,604
3 Claims. (Cl. 260—78.4)

ABSTRACT OF THE DISCLOSURE

This invention relates to a novel process for the preparation of a class of water soluble polymeric derivatives. More particularly, this invention relates to a novel process for preparing the water soluble acid salts of primary and secondary aminoalkyl esters of carboxylic acid polymers by means of the reaction, in an aqueous medium, between a carboxylic acid polymer and either a primary or a secondary alkyleneimine.

Related application

This application is a continuation-in-part of our copending applications Ser. No. 394,055 now abandoned, filed Sept. 2, 1964, and Ser. No. 561,749, filed June 30, 1966, and each assigned to the assignee of the subject application; application Ser. No. 561,749 itself being a continuation-in-part of application Ser. No. 394,055.

Background of the invention

Although primary and secondary aminoalkyl esters of carboxylic acid polymers are disclosed by the prior art, the conventional polymerization procedures heretofore utilized for their preparation have not been able to prepare these useful polymers so that they exhibited substantial molecular weights. Thus, at best, primary and secondary aminoalkyl esters of carboxylic acid polymers could be prepared so as to have a molecular weight of only about 20,000 to 25,000.

Needless to say, such low molecular weight products could not, in many cases, be successfully utilized in certain applications, such as in papermaking and flocculation procedures, where it is usually necessary to employ polymers having substantially higher molecular weights.

It is, therefore, the prime object of this invention to provide primary and secondary aminoalkyl esters of carboxylic acid polymers having molecular weights sufficiently high to permit their use in the applications wherein the low molecular weight products of the prior art proved inadequate.

Detailed description of the invention

In accordance with the invention, we have found a novel method for preparing water soluble, acid salts of primary and secondary aminoalkyl esters of carboxylic acid polymers via the reaction between either a primary or secondary alkyleneimine and the carboxyl groups of a homo- or copolymer containing at least 50% of the mers, i.e. the repetitive chemical-structural units of a polymer, which are derived from an ethylenically unsaturated carboxylic acid.

The novel process of this invention is thus seen to lead to the preparation of the water soluble acid salts of primary and secondary aminoalkyl esters of carboxylic acids wherein the carboxyl groups have been aminoalkylated so that the mers derived from the ethylenically unsaturated carboxylic acid which are present within the polymer correspond to the formulae:

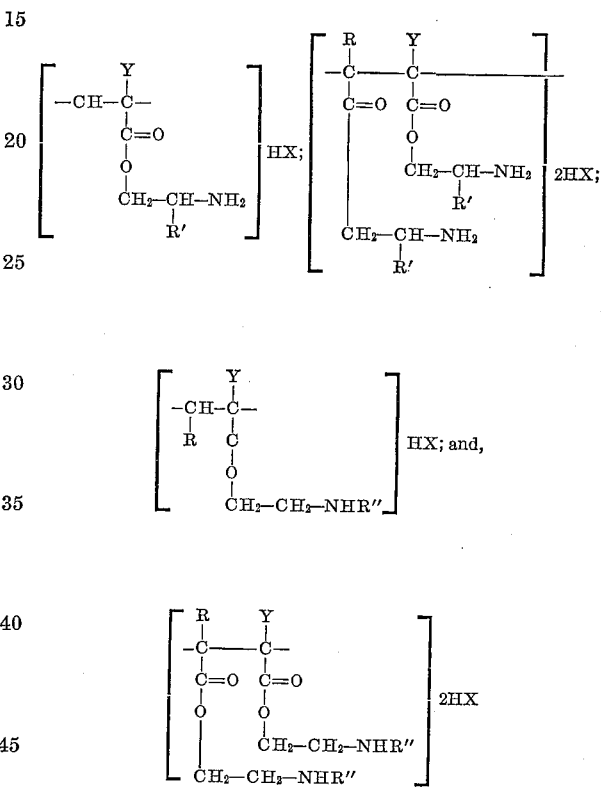

wherein R and R' are radicals selected from the class consisting of the hydrogen, i.e. —H, and methyl, i.e. —CH₃, and ethyl, i.e. —CH₂—CH₃, radicals; wherein R" is a radical selected from the group consisting of the methyl and ethyl radicals; wherein X is an acidic anion derived from an organic or inorganic acid; and Y is a radical selected from the group consisting of the hydrogen, methyl, and ethyl, radicals.

In the preparation of paper, various materials are added to the paper stock prior to the formation of the sheet in order to impart desired characteristics to the finished paper. Thus, for example, water insoluble pigments are often employed in order to increase the opacity of the finished sheet, improve its printing properties, and control its brightness. Finely divided suspensions of pigments such as clay, titanium dioxide, calcium carbonate, blanc fixe, talc, and the like, are usually added to a pulp slurry that has been subjected to mechanical beating. The pigment particles are then usually flocculated onto the paper fibers by the addition of suitable flocculating agents.

Numerous materials have been, heretofore, used as flocculation and retention agents such as, for example, hydrated aluminum sulfate, and polymers such as polyacrylamide, cationic polyamides, and various cationic starches. Despite their widespread use, many of these retention agents exhibit a number of deficiencies in the paper making process particularly with respect to the fact that, under the acid conditions which prevail in many paper making operations, the cationic materials lose much of their ability to function as pigments retention agents. On the other hand, retention agents which are inherently anionic in nature are not effective when paper is made under neutral or alkaline conditions. In addition, it may also be noted that although many presently available materials may provide acceptable results as pigment retention agents, they do not however impart any strength to the paper and their use does, in fact, often lead to a decided decrease in the tensile or bursting strength of the paper into which they have been incorporated. This loss of strength is due to the resulting higher ash contents of the papers thus produced which, in turn, frequently necessitates the separate and costly addition of strengthening agents such as starches or gums.

The use of aqueous solutions of the above described water soluble polymeric derivatives as pigment retention agents in the paper making process provides a substantial increase in the percentage of pigments which are retained by the pulp fibers as compared with the results achieved with many of the presently available retention agents. Moreover, these polymeric derivatives are fully operable under alkaline as well as acid conditions and, they are found, surprisingly, to also provide an increase in the tensile strength of the paper sheets wherein they have been incorporated. They also provide increases in the retention of many other materials which may be incorporated in paper such as ketene dimer and wax emulsion sizing agents, thermoplastic resin dispersions, asphalt, carbon black, and dyes, etc.

The carboxylic acid polymers which are utilized in conducting the novel process of this invention may, as noted earlier, comprise either homopolymers of ethylenically unsaturated carboxylic acids selected from the group consisting of acrylic acid, methacrylic acid, crotonic acid, ethacrylic acid, fumaric acid, maleic acid, and itaconic acid as well as copolymers containing carboxylated mers which are derived from any of the latter ethylenically unsaturated carboxylic acids. The comonomers which may be used in preparing the applicable copolymers of these ethylenically unsaturated carboxylic acids include other ethylenically unsaturated, i.e., vinyl, comonomers such as acrylamide, methyl vinyl ether, ethyl vinyl ether, methacrylamide, the lower alkyl esters of acrylic and methacrylic acids, hydroxypropyl acrylate, hydroxypropyl methacrylate, hydroxyethyl acrylate, hydroxyethyl methacrylate, and vinyl acetate, etc.

We have found that optimum results in the process of this invention are attained by the use of homo- and copolymers of ethylenically unsaturated monocarboxylic acids such, for example, as polyacrylic acid. The latter monocarboxylic acid polymers yield aminoalkylated derivatives which tend to resist the undesirable formation of gels far more successfully than the derivatives which are prepared when the process of the invention is conducted with polymers of ethylenically unsaturated dicarboxylic acids such as maleic and fumaric acids.

The above described homo- and copolymers of ethylenically unsaturated carboxylic acids may be prepared by means of free radical initiated polymerization techniques which are well known to those skilled in the art. However, inasmuch as the ultimate polymeric derivatives are to be prepared and utilized in the form of their aqueous solutions, it is therefore convenient to prepare these carboxylic acid polymers in the form of their aqueous solutions which should, preferably, have a range of resin solids contents of from about 10 to 50%, by weight.

The novel derivatives resulting from the process of this invention should, preferably, have at least 50 mole percent of their mers aminoalkylated as described in the formulae presented hereinabove. Thus, where homopolymers of carboxylic acids are utilized in the reaction, it is necessary that at least 50 mole percent of their mers undergo the aminoalkylation reaction. On the other hand, where copolymers of ethylenically unsaturated carboxylic acids with one or more vinyl comonomers are employed, such copolymers will therefore have to contain at least 50 mole percent of carboxylated mers so that in the aminoalkylated derivatives derived therefrom, there will again be at least 50 mole percent of aminoalkylated mers. If desired such copolymers can, of course, contain more than 50 mole percent of carboxylated mers.

The alkyleneimines which are applicable for use in conducting the novel process of this invention comprise, in effect, any alkyleneimine which upon reaction with a polymeric carboxyl group will yield either a primary or a secondary aminoalkyl ester group. Thus, among the alkyleneimines which will yield primary aminoalkyl ester groups and which are therefore suitable for use in the process of this invention are such primary alkyleneimines as ethyleneimine, propyleneimine, butyleneimine and the like. While, among the secondary alkyleneimines which will yield secondary aminoalkyl ester groups and which are, therefore, also suitable for use in the process of this invention are N-ethyl ethyleneimine, N-hydroxyethyl ethyleneimine, and the like.

The primary and secondary aminoalkyl ester substituted carboxylic acids resulting from the process of this invention are, as noted earlier, prepared in the form of their water soluble acid salts. Thus, it is necessary to include a neutralizing acid in the reaction mixture wherein these derivatives are being synthesized. For this purpose any inorganic or organic acid capable of yielding a water soluble salt may be employed as, for example, hydrochloric, hydrobromic, sulfuric, phosphoric, nitric, acetic, formic, propionic, butyric, citric, and similar acids.

The actual procedure to be used in preparing these water soluble polymeric derivatives by means of the novel process of this invention involves the initial step of heating, with agitation, of an aqueous solution of the homo- or copolymer of the ethylenically unsaturated carboxylic acid to a temperature in the range of about 30 to 100° C., preferably 40–60° C., and thereupon maintaining the polymer solution at this elevated temperature during the entire course of the reaction. To the heated, agitated polymer solution, there is then slowly added a portion, comprising no more than about 50 mole percent of the total concentration, of the selected alkyleneimine; the addition of the latter reagent being conducted at a rate such that it is never present in the system in a large excess which might lead to its homopolymerization. The resulting mixture is then further agitated for a period of about 5 to 60 minutes during which time it will be noted that there is a sharp increase in the viscosity of the polymer solution.

At this point, one may introduce additional water if it is desired to effect a decrease in the viscosity of the solution whereupon a portion of the selected acid, said portion being equal or less, on a molar basis, than the amount of the previously added alkyleneimine, is introduced in order to break up the internal salt formed via the initial reaction between the polymer and the alkyleneimine whereupon the mixture is stirred for another 5 to 60 minutes. The remaining alkyleneimine is then slowly introduced at the same rate of addition, as noted above, for the addition of the initial portion of alkyleneimine. After further agitation for a period of about 5 to 60 minutes, the reaction is completed by the addition of the remaining acid whereupon the resulting solution is cooled down to room temperature. The final product is in the form of a free flowing solution having a resin solids content in the range of from about 10 to 50%, by weight.

It is most important that the above described reaction sequence, involving the initial slow addition of a portion of the alkyleneimine followed, in turn, by a portion of the neutralizing acid, the remainder of the alkyleneimine and finally by the remainder of the acid be utilized in preparing these novel derivatives. Moreover, it is also important that, within the reaction system, there should always be present a concentration of the alkyleneimine which, on a molar basis, is equal or greater than the concentration of the neutralizing acid. The latter restrictions are required so as to prevent the undesirable homopolymerization of the alkyleneimine during the course of the novel process of this invention. Thus, the two important process limitations which avoid this homopolymerization of the alkyleneimine are: (1) The reaction should be initiated by the slow addition to the polymer solution of the alkyleneimine, and (2) during the course of the reaction one should always maintain a concentration of the alkyleneimine which, on a molar basis, is equal or greater than the concentration of the neutralizing acid.

Another, although less desirable, technique which may be utilized to achieve the above described reaction conditions involves the simultaneous slow addition, to the polymer solution, of the alkyleneimine and the acid wherein the amount of alkyleneimine, on a molar basis, is always greater than the amount of acid which is utilized.

With respect to proportions, it is preferred to use a slight molar excess in the order of about 1 to 10% of the alkyleneimine over the concentration of the available carboxyl groups which are present in the homo- or copolymer of the ethylenically unsaturated carboxylic acid. The use of such an excess of alkyleneimine leads to the preparation of derivatives wherein essentially all of the available carboxyl groups of the carboxylic acid polymer have been aminoalkylated and the resulting fully aminoalkylated derivatives have been found to be particularly efficient when employed as pigment retention and strengthening agents in the paper manufacturing process. Thus, unless all of the available carboxyl groups have been converted into primary aminoalkyl groups, the ability of the resulting polymeric derivatives to be successfully utilized as pigment retention and strengthening agents will be curtailed. This curtailment of pigment retention and strengthening efficiency on the part of these incompletely reacted derivatives results from the fact that their efficient utilization will be limited to papermaking processes which must be conducted at a pH range of from about 4 to 6; whereas, if they are utilized at a pH greater than the latter maximum limit the results will be quite poor. Moreover, this dependence upon an acidic or neutral pH range has been found to exist even in those derivatives wherein only about 1–10% of the available carboxyl groups have remained unreacted. In contrast, those derivatives resulting from the process of our invention wherein all of the carboxyl groups have been completely reacted are operable as pigment retention and strengthening agents over the broad pH range of from 4 to 8, or higher.

As for the total concentration of the neutralizing acid, the latter reagent should be present, at the conclusion of the reaction, in a concentration which, on a molar basis, is equivalent to that of the concentration of the alkyleneimine. As has been noted, a quantity of water, in addition to that which is present in the polymer solution, may be introduced into the system during the course of the reaction in order to decrease the viscosity of the polymer solution. The amount thus added is left to the discretion of the practitioner.

The fact that the derivatives resulting from the novel process of this invention are produced in the form of their water soluble acid salts has been found to result in a rather unexpected advantage. Thus, whereas aqueous solutions of the free amine form of these primary and secondary aminoalkyl esters of carboxylic acid polymers have been observed to have very poor storage stability, as indicated by their gradual gellation, the acid salts resulting from the process of our invention possess excellent stability and may be stored for prolonged periods without the danger of any gellation taking place. The storage stability, on the part of these novel derivatives, is still further enhanced by the use, in their preparation, of an excess concentration of the neutralizing acid.

In the following examples, which further illustrate the embodiment of this invention, all parts given are by weight unless otherwise indicated.

*Example 1.*—This example illustrates the preparation, by means of the novel process of this invention, of a water soluble acid salt of a primary aminoalkyl ester of a carboxylic acid polymer which in this case was the hydrochloride salt of the ethyleneimine derivative of polyacrylic acid hereinafter referred to as the hydrochloride salt of poly(aminoethyl acrylate).

Into a reaction vessel containing means for mechanical agitation were placed 242 parts of an aqueous solution containing 20.6%, by weight, of polyacrylic acid having an I.V., i.e. an intrinsic viscosity, of 0.5 in dioxane at 25° C. With agitation, this solution was heated to a temperature of 70° C. and the latter temperature was thereupon maintained throughout the entire course of the reaction. Next, 16.45 parts of ethyleneimine were slowly introduced into the agitated polymer solution; the addition of the ethyleneimine was completed over a period of 60 minutes. After further agitation for another 30 minute period, it was noted that the viscosity of the solution had increased considerably.

At this point, 104 parts of water and 70 parts of a mixture containing equal parts, by weight, of concentrated hydrocholoric acid and water were added and the mixture thereupon agitated for 15 minutes. The introduction of the water served to effect a decrease in the viscosity of the solution. The remaining portion, i.e., 16.45 parts of ethyleneimine was thereupon slowly added over a period of 60 minutes and agitation was then continued for an additional 30 minutes. To complete the reaction, another 81 parts of the 1:1 hydrochloric acid:water mixture were added whereupon the resulting solution was cooled to room temperature.

The product thus prepared was in the form of a free flowing solution having a light orange color. This solution was found, on analysis, to contain 20.9%, by weight, of the hydrochloric salt of poly(aminoethyl acrylate) thereby indicating a complete conversion of the available carboxyl groups in the polyacrylic acid.

*Example II.*—The following example illustrates the preparation, by means of the novel process of the invention, of additional representatives of the water soluble acid salts of primary aminoalkyl esters of carboxylic acid polymers.

In preparing these derivatives, the identical basic procedure, as described in Example I hereinabove, for the preparation of the hydrochloride salt of poly(aminoethyl acrylate) was again utilized. However, variations were of course made with respect to the particular polymers, alkyleneimines, and acids which were employed and in some cases the use of additional water was not required.

The following table lists the various derivatives which were prepared and indicates the different polymers, acids, and alkyleneimines utilized for their preparation. Unless otherwise noted, the comonomer proportions are given on a weight basis.

| Derivative | Polymer Solution | Alkyleneimine | Acid* | Parts Water Added | Percent Deriv. Solids in Final Solution |
|---|---|---|---|---|---|
| The hydrochloride salt of poly (aminoethyl acrylate-acrylamide). | 238 parts of an H₂O solution containing 21.1%, by wt., of a 1:1 copolymer of acrylic acid and acrylamide, I.V.=1.19 in dioxane at 25° C. | 16.4 parts of ethyleneimine. | 75.7 parts of a 1:1 conc. HCl:H₂O mixture. | 88.0 | 19.2 |
| The hydrochloride salt of poly (aminoethyl acrylate-hydroxypropyl acrylate). | 234 parts of an H₂O solution containing 21.4%, by wt., of a 1:1 copolymer of acrylic acid and hydroxypropyl acrylate, I.V.=0.5 in dioxane at 25° C. | ....do............ | ....do.................... | None | 24.6 |
| The hydrochloride salt of poly (2-aminopropyl acrylate). | 185 parts of an H₂O solution containing 27.0%, by wt., of polyacrylic acid, I.V.=0.7 in dioxane at 25° C. | 43.6 parts of propyleneimine. | 151.0 parts of a 1:1 conc. HCl:H₂O mixture. | 157.0 | 22.6 |
| The hydrochloride salt of poly(aminoethyl methacrylate). | 211 parts of an H₂O solution containing 28.3%, by wt., of polymethacrylic acid, I.V.=0.1 in dioxane at 25° C. | 32.9 parts of ethyleneimine. | ....do.................... | 181.0 | 20.9 |
| The hydrochloride salt of poly(aminoethyl acrylate-ethyl acrylate). | 199 parts of a 1:1 H₂O:ethanol solution containing 25.1%, by wt., of the 1:1 copolymer of acrylic acid and ethyl acrylate, I.V.=0.24 in dioxane at 25° C. | 16.4 parts of ethyleneimine. | 75.5 parts of a 1:1 conc. HCl:H₂O mixture. | None | 27.6 |
| The dihydrogen phosphate salt of poly(aminoethyl acrylate). | 185 parts of an H₂O solution containing 27.0%, by wt., of polyacrylic acid, I.V.=0.7 in dioxane at 25° C. | 32.9 parts of ethyleneimine. | 176.0 parts of a 1:1 H₃PO₄:H₂O mixture. | None | 40.0 |
| The nitrate salt of poly(aminoethyl acrylate). | ....do............................. | ....do............ | 138.0 parts of a 1:1 conc. HNO₃:H₂O mixture. | None | 36.8 |
| The sulfate salt of poly(aminoethyl acrylate). | ....do............................. | ....do............ | 79.0 parts of a 1:1 conc. H₂SO₄:H₂O mixture. | None | 40.1 |
| The formic acid salt of poly (aminoethyl acrylate). | ....do............................. | ....do............ | 80.0 parts of a 1:1 conc. Formic acid:H₂O mixture. | None | 39.6 |
| The acetic acid salt of poly (aminoethyl acrylate). | ....do............................. | ....do............ | 92.0 parts of a 1:1 glacial acetic acid:H₂O mixture. | None | 41.6 |
| The hydrochloride salt of poly(di[aminoethyl]maleate-methyl vinyl ether). | 300 parts of an H₂O solution containing 12.6%, by wt., of the 1:1 copolymer of maleic acid and methyl vinyl ether (molar basis). | 20.6 parts of ethyleneimine. | 94.8 parts of a 1:1 conc. HCl:H₂O mixture. | 200.0 | 12.6 |

*Each of the various acid:water mixtures are on a parts by weight basis.

*Example III.*—This example illustrates the preparation, by means of the process of this invention, of a sample of the hydrochloride salt of poly(aminoethyl acrylate) wherein all of the available carboxyl groups of the polyacrylic acid had not been reacted with an alkyleneimine.

In preparing this derivative, the basic procedure described in Example I, hereinabove, was again utilized with the exception, in this instance, that a total of only 29.9 parts of ethyleneimine were reacted with the polyacrylic acid. The latter concentration of ethyleneimine was thus exactly equivalent to the molar concentration of available carboxyl groups in the polyacrylic acid whereas the 32.9 parts of ethyleneimine which had been utilized in Example I represented an excess of the latter reagent equivalent to 1.1 moles of the available carboxyl groups in the polyacrylic acid. Thus, in the resulting product, only about 95% of the available carboxyl groups had been converted.

*Example IV.*—This example illustrates the preparation, by means of the novel process of this invention, of a water soluble acid salt of a secondary aminoalkyl ester of a carboxylic acid polymer which in this case was the hydrochloride salt of the N-hydroxyethyl ethyleneimine derivative of polyacrylic acid hereinafter referred to as the hydrochloride salt of poly(N-hydroxyethyl aminoethyl acrylate).

Into reaction vessel containing means for mechanical agitation were placed 150 parts of an aqueous solution containing 18.0%, by weight, of polyacrylic acid having an I.V., i.e. an intrinsic viscosity, of 0.5 in dioxane at 25° C. With agitation, this solution was heated to a temperature of 70° C. and the latter temperature was thereupon maintained throughout the entire course of the reaction. Next, 34.5 parts of N-hydroxyethyl ethyleneimine were slowly introduced into the agitated polymer solution; the addition of the ethyleneimine was completed over a period of 60 minutes. After further agitation for another 30 minute period, it was noted that the viscosity of the solution had increased considerably.

At this point, 19 parts, by weight, of concentrated hydrochloric acid were added and the mixture thereupon agitated for 15 minutes. The remaining portion, i.e. 17.25 parts of N-hydroxyethyl ethyleneimine was thereupon slowly added over a period of 60 minutes and agitation was then continued for an additional 30 minutes. To complete the reaction, another 19.5 parts of concentrated hydrochloric acid were added whereupon the resulting solution was cooled to room temperature.

The product thus prepared was in the form of a free flowing solution having a light orange color. This solution was found, on analysis, to contain 33.0%, by weight, of the hydrochloride salt of poly(N-hydroxyethyl aminoethyl acrylate) thereby indicating a complete conversion of the available carboxyl groups in the polyacrylic acid.

*Example V.*—The following example illustrates the preparation, by means of the novel process of this invention, of additional representatives of the water soluble acid salts of secondary aminoalkyl esters of carboxylic acid polymers.

In preparing these derivatives, the indentical basic procedure, as described in Example IV, hereinabove, for the preparation of the hydrochloride salt of poly(N-hydroxyethyl aminoethyl acrylate) was again utilized. However, variations were of course made with respect to the particular polymers, alkyleneimines, and acids which were employed and in some cases the use of additional water was not required.

The following table lists the various derivatives which were prepared and indicates the different polymers, acids, and alkyleneimines utilized for their preparation. Unless otherwise noted, the comonomer proportions are given on a weight basis.

| Derivative | Polymer Solution | Alkyleneimine | Acid* | Parts Water Added | Percent Deriv. Solids in Final Solution |
|---|---|---|---|---|---|
| The hydrochloride salt of poly-(N-hydroxyethyl acrylate acrylamide). | 150 parts of an H₂O solution containing 18.0% by wt., of a 1:1 copolymer of acrylic acid and acrylamide, I.V.=1.19 in dioxane at 25° C. | 17.2 parts of N-hydroxyethyl ethyleneimine | 19.5 parts of conc. HCl | None | 26.0 |
| The hydrochloride salt of poly-(N-hydroxyethyl aminoethyl acrylate-hydroxypropyl acrylate). | 234 parts of an H₂O solution containing 21.4%, by wt., of a 1:1 copolymer of acrylic acid and hydroxypropyl acrylate, I.V.=0.5 in dioxane at 25° C. | ----do---------- | ----do---------- | None | 25.0 |
| The hydrochloride salt of poly-(N-methyl aminoethyl acrylate). | 185 parts of an H₂O solution containing 27.0%, by wt., of polyacrylic acid, I.V.=0.7 in dioxane at 25° C. | 43.6 parts of N-methyl ethyleneimine | 24.0 parts of a 1:1 conc. HCl:H₂O mixture. | 157.0 | 22.6 |
| The hydrochloride salt of poly-(N-hydroxyethyl aminoethyl methacrylate). | 100 parts of an H₂O solution containing 20.0%, by wt., of polymethacrylic acid, I.V.=0.1 in dioxane at 25° C. | 21.0 parts of N-hydroxyethyl ethyleneimine | 24.0 parts of conc. HCl | None | 32.0 |
| The hydrochloride salt of poly-(N-ethyl aminoethyl acrylate-ethyl acrylate). | 200 parts of a 1:1 H₂O:ethanol solution containing 25.0%, by wt., of the 1:1 copolymer of acrylic acid and ethyl acrylate, I.V.=0.24 in dioxane at 25° C. | 27.0 parts of N-ethyl ethyleneimine. | 76.0 parts of a 1:1 conc. HCl:H₂O mixture. | None | 28.5 |
| The nitrate salt of poly(N-ethyl aminoethyl acrylate). | 100 parts of an H₂O solution containing 15.0%, by wt., of polyacrylic acid, I.V.=0.7 in dioxane at 25° C. | 16.5 parts of N-ethyl ethyleneimine | 29.0 parts of a 1:1 conc. HNO₃:H₂O mixture. | None | 30.5 |
| The formic acid salt of poly-(N-ethyl aminoethyl acrylate). | ----do---------- | ----do---------- | 22.0 parts of a 1:1 conc. formic acid: H₂O mixture. | None | 29.5 |

*Example VI.*—This example illustrates the preparation, by means of the novel process of this invention, of a sample of the hydrochloride salt of poly(N-hydroxyethyl aminoethyl acrylate) wherein all of the available carboxyl groups of the polyacrylic acid had not been reacted with an alkyleneimine.

In preparing this derivative, the basic procedure described in Example IV, hereinabove, was again utilized with the exception, in this instance, that a total of only 31.0 parts of N-hydroxyethyl ethyleneimine were reacted with a polyacrylic acid. The latter concentration of N-hydroxyethyl ethyleneimine was thus exactly equivalent to the molar concentration of available carboxyl groups in the polyacrylic acid whereas the 34.5 parts of N-hydroxyethyl ethyleneimine which had been utilized in Example IV represented an excess of the latter reagent equivalent to 1.1 moles of the available carboxyl groups in the polyacrylic acid. Thus, in the resulting product, about 95% of the available carboxyl groups had been converted.

Summarizing, the novel process of this invention provides the practitioner with a simple procedure for the preparation of the water soluble acid salts of primary and secondary aminoalkyl esters of carboxylic acid polymers. Variations may be made in proportions, procedures and materials without departing from the scope of this invention which is limited only by the following claims.

We claim:

1. The process for the preparation of water soluble polymeric derivatives comprising the water soluble acid salts of aminoalkyl esters of carboxylic acid polymers wherein the carboxyl groups of said carboxylic acid polymers have been aminoalkylated so that the carboxylated mers of said polymers are selected from the group consisting of:

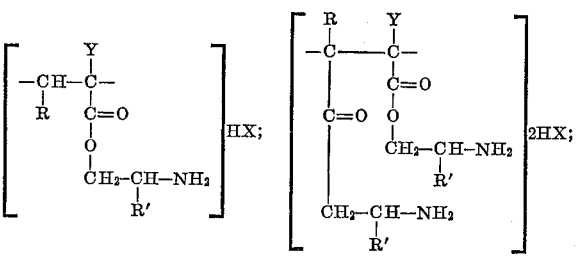

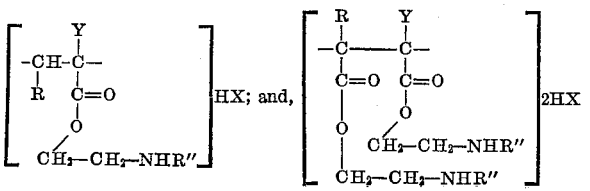

wherein R and R' are radicals selected from the class consisting of the hydrogen, methyl and ethyl radicals; wherein R'' is a radical selected from the group consisting of the methyl and ethyl radicals; wherein X is an acidic anion; and, Y is a radical selected from the group consisting of the hydrogen, methyl and ethyl radicals; wherein said carboxylic acid polymer is selected from the class consisting of the homopolymers of ethylenically unsaturated carboxylic acids selected from the group consisting of acrylic, methacrylic, crotonic, ethacrylic, fumaric, maleic and itaconic acids and the copolymers of said ethylenically unsaturated carboxylic acids with at least one ethylenically unsaturated comonomer, said carboxylic acid polymer containing at least 50 mole percent of aminoalkylated mers; said process comprising reacting, in an aqueous medium, a carboxylic acid polymer and an alkyleneimine; the reaction sequence for said process comprising the initial addition to said aqueous carboxylic acid polymer solution of a portion of said alkyleneimine comprising no more than 50 mole percent of the total concentration of said alkyleneimine which is added to the system at a rate such that it is at no time present therein in an excess concentration with respect to said carboxylic acid polymer which excess concentration would, therefore, be conducive to the homopolymerization of said alkyleneimine, followed in sequence by a portion of a neutralizing acid selected from the class consisting of organic and inorganic acids, the remainder of said alkyleneimine and, finally, by the remainder of said neutralizing acid; the total concentration of said neutralizing acid at the conclusion of the reaction being on a molar basis, equivalent to the total concentration of the alkyleneimine while, during the course of the reaction prior to the addition of the final portion of said neutralizing acid, the concentration of said alkyleneimine is, on a molar basis, at least equivalent to the concentration of neutralizing acid which has previously been introduced into the system.

2. The process of claim 1, wherein the total concentration of said alkyleneimine is in about a 1 to 10% molar excess over the concentration of the available carboxyl groups on said carboxylic acid polymer.

3. The process of claim 1, wherein said alkyleneimine is selected from the class consisting of primary alkyleneimines and secondary alkyleneimines.

References Cited

UNITED STATES PATENTS 3,280,218  10/1966  Endsley et al. _____ 260—874

JOSEPH L. SCHOFER, *Primary Examiner.*

C. A. HENDERSON, *Assistant Examiner.*